F. H. ALEXANDER.
CLUTCH COUPLING FOR THE TRANSMISSION OF POWER BY SHAFTING.
APPLICATION FILED JAN. 6, 1919.

1,327,935.

Patented Jan. 13, 1920.

Inventor
Francis Herbert Alexander
by
his Attorney

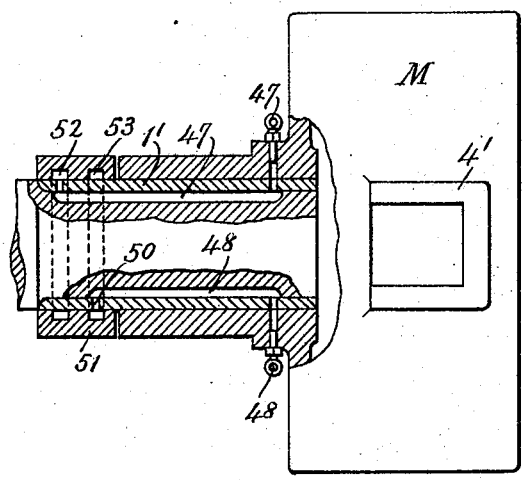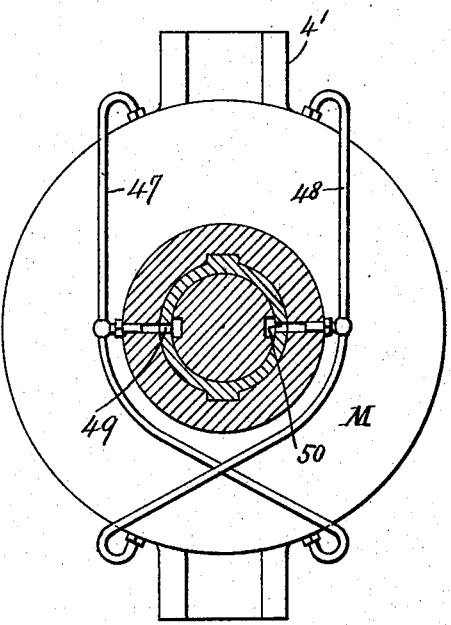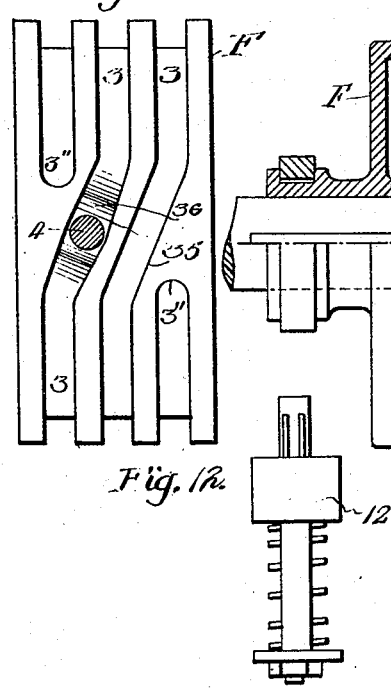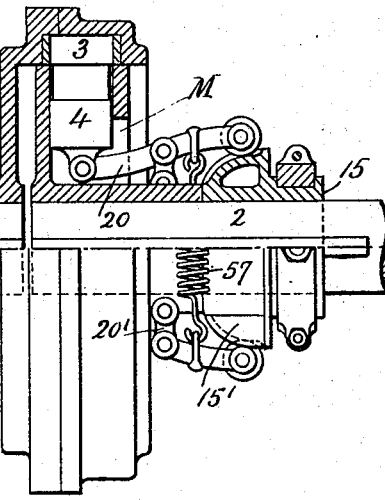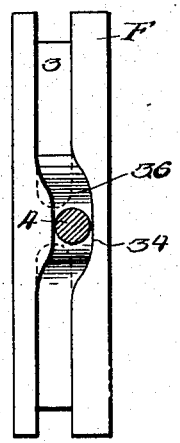

F. H. ALEXANDER.
CLUTCH COUPLING FOR THE TRANSMISSION OF POWER BY SHAFTING.
APPLICATION FILED JAN. 6, 1919.
1,327,935.
Patented Jan. 13, 1920.
3 SHEETS—SHEET 3.
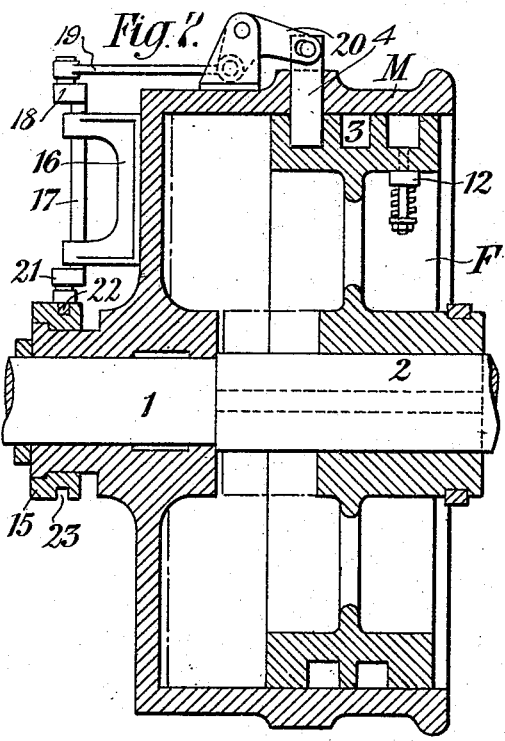
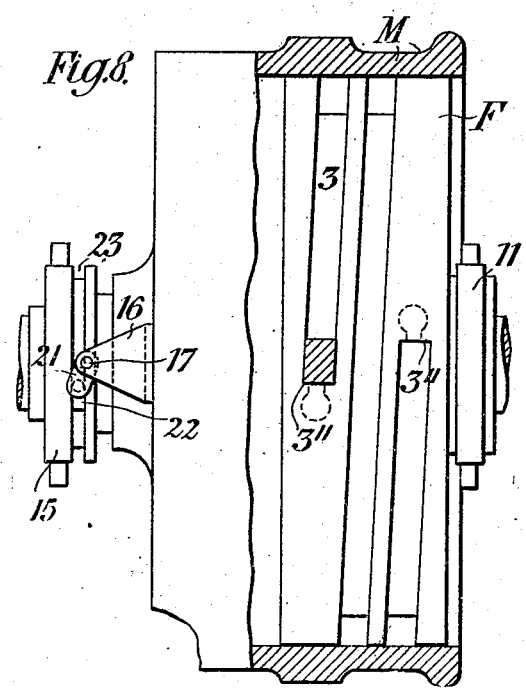
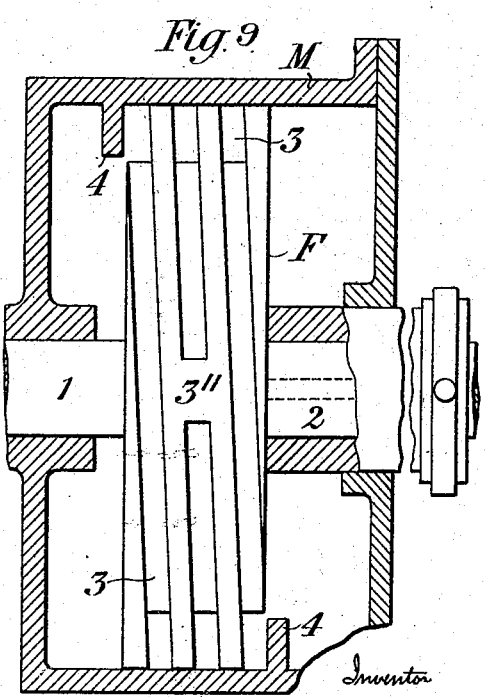

UNITED STATES PATENT OFFICE.

FRANCIS HERBERT ALEXANDER, OF JESMOND, NEWCASTLE-UPON-TYNE, ENGLAND.

CLUTCH-COUPLING FOR THE TRANSMISSION OF POWER BY SHAFTING.

1,327,935.  Specification of Letters Patent.  Patented Jan. 13, 1920.

Application filed January 6, 1919. Serial No. 269,866.

*To all whom it may concern:*

Be it known that I, FRANCIS HERBERT ALEXANDER, a subject of His Majesty the King of Great Britain, residing at 34 Burdon Terrace, Jesmond, Newcastle-upon-Tyne, England, have invented certain new and useful Improvements in and Relating to Clutch-Couplings for the Transmission of Power by Shafting; and I do hereby declare the following to be a full, clear, and exact description of the invention, such as will enable others skilled in the art to which it appertains to make and use the same.

This invention relates to clutch couplings for the transmission of power by shafting, of the type in which a dog or projection on one clutch member positively engages with a stop on the other clutch member to transmit the torque of the shafting, such stop being provided by the wall of a recess in the second clutch member, for example.

Unless the clutch members are at rest, or rotating in the same direction and at substantially the same speed, when brought into engagement, the drive is taken up with a sudden jerk, which is liable to damage and quickly wear out the mechanism.

The object of my invention is to avoid or minimize shock or jar at all times when the members of such a clutch coupling are brought into operative engagement, by insuring that the impact between the dog of the one clutch member, hereinafter called the male clutch member, and the stop of the other clutch member, hereinafter called the female clutch member, shall be adequately cushioned by compressed air or other elastic fluid.

To this end I cause the dog of the male clutch member to enter a channel or slot of considerable length in the female clutch member, the end of this channel constituting the stop by which the drive is taken up. The dog makes a close but freely sliding fit with the channel and is caused to enter it at a predetermined point situated at a substantial distance from the end of the channel with which it is to contact to transmit the torque of the shafting. As the dog travels along the channel toward the said end it compresses the air in front of it, and the latter gradually escaping by leakage, or through a valve or outlet provided for the purpose, the dog and stop come into positive contact without appreciable jar or shock, owing to their impact being thus air cushioned.

My invention is applicable to clutch couplings of various constructional forms, more particularly the drum and cylinder type, and provides for operation of the clutch in either direction of rotation of the shaft. In a clutch of this type, the channel may be formed around the exterior of the drum member, and the dog project from, or be adapted for projection from, the interior of the cylindrical member, or this arrangement may be reversed.

The dog may be projected and retracted from the male clutch member by any suitable means to cause it to enter and withdraw from the channel of the female clutch member; in certain cases the insertion and withdrawal of the dog may be effected by sliding either clutch member axially of its shaft.

I will now fully describe my invention with reference to the annexed drawings in which similar reference numerals and letters refer to corresponding parts in all the figures.

Fig. 4 is a sectional plan of the male clutch member Fig. 1.

Fig. 5 is an end elevation of the male clutch member seen from the left of Fig. 1.

Fig. 6 is a sectional elevation of a modification.

Fig. 7 is a sectional elevation of another modificatiton.

Fig. 8 is a part sectional plan view of Fig. 7.

Fig. 9 is another slight modification in sectional elevation.

Figs. 10 and 11 are side elevations showing modified constructions of the female clutch member.

Fig. 12 is a detail view in elevation of a relief valve.

Figure 1:
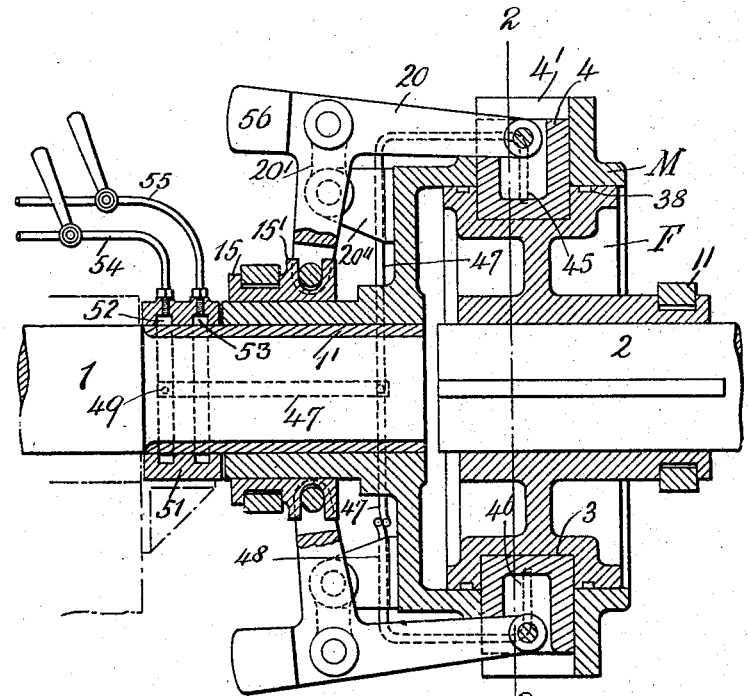
Figure 1 is a sectional elevation of a clutch coupling of drum and cylinder type in accordance with my invention.
Figure 3:
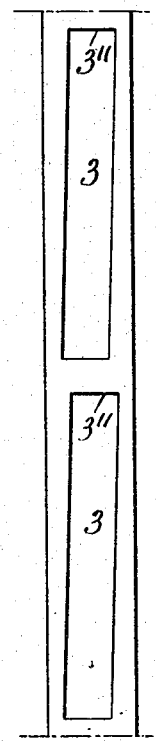
Fig. 3 is a diagrammatic detail.

Referring to Figs. 1 to 5, the cylindrical male clutch member M is keyed on the shaft 1 and the female drum member F is slidably keyed on the shaft 2. Extending around the periphery of the female member F are two angularly running or helical channels 3 whose ends 3″ constitute stops. The arrangement of these channels is clearly seen in the diagrammatic view Fig. 3, which shows a development of the periphery of the member F. Radially movable within slotted guides 4′ formed and oppositely located on the periphery of the cylindrical member M are the dogs 4 adapted to be simultaneously inserted into and withdrawn from the channels 3. Pivotally connected with each dog is one arm of a bell crank lever 20 which is fulcrumed to a link 20′ pivoted to a lug 20″ on the member M. The other arm of this lever pivotally engages with a recessed block 15′ carried by a collar 15 slidably mounted on the boss of the member M. When this collar is moved axially by any suitable means it operates the bell cranks 20 to simultaneously insert the dogs 4 into, or withdraw them from the two angularly running or helical channels 3.

In connecting the members of the coupling, each dog 4 should enter a channel 3 adjacent to a stop end 3″ thereof; then, owing to relative rotation of the members M and F in the appropriate direction, the dogs will leave these stops and travel along the channels 3 compressing the air in front of them, so that their contact with the stops 3″ at the other ends of the channels will be air cushioned. The air may escape by leakage, but preferably relief valves indicated by 12 are provided.

Entry of the dogs at the predetermined parts of the channels is insured by adjusting the member F axially, as by the collar 11 rotatable on its boss, so as to bring those parts of the channels to be entered by the dogs in line with the latter. If pressure be then applied to the dogs, tending to thrust them inwardly, the dogs will ride on the periphery of the drum F as the clutch members relatively rotate, until they arrive opposite these parts, when they will jump into the channels. Entry of each dog into its channel at a predetermined part thereof only, may thus be insured by relative axial adjustment of the members M and F, owing to the fact that the channels 3 run angularly to the plane of rotation or are helically disposed.

The clutch coupling above described will obviously operate in either direction of rotation. If the members M and F rotate clockwise, the dogs 4 will be inserted in the positions shown in Fig. 2; if the rotation of said members is anti-clockwise, then the member F will be axially adjusted to cause entry of the dogs into the channels on the opposite sides of the stops seen in Fig. 2.

While in many cases air at natural pressure may be compressed in the channels 3 to obtain the cushioning effect, air previously compressed may be introduced into the channels for further compression, if desired, and convenient means for effecting this is shown.

Figure 2:
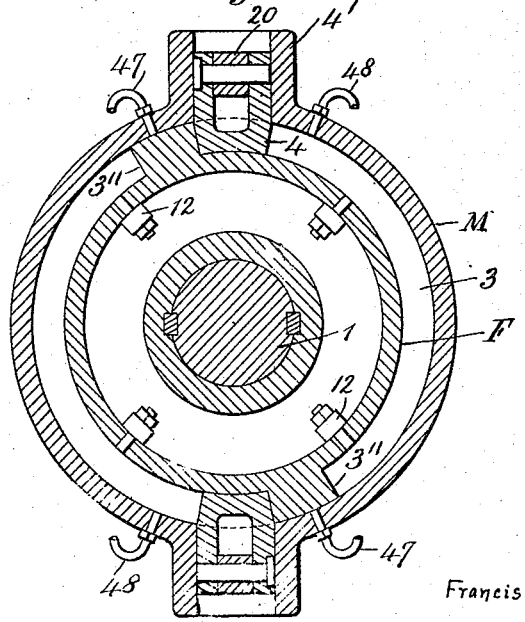
Fig. 2 is a transverse section on the line 2—2 of Fig. 1, looking from the left of said figure.

From ports 45 and 46 opening into the channels 3, air passages 47 and 48 respectively lead to ports 49, 50 in the periphery of shaft 1. Portions of the air passages may, for convenience of construction, be grooved in the shaft 1 and covered by a sleeve 1′ fixed on the shaft, the said ports 49, 50 opening through this sleeve. The shaft 1 rotates within the fixed casing or bearing 51 wherein are two annular grooves 52, 53, respectively in constant communication with the ports 49, 50. Compressed air from a suitable source is led to the grooves 52, 53 by the cock controlled pipes 54, 55. According to the direction of rotation of the coupling, so the cock of pipe 54, or that of pipe 55, is opened to pass compressed air to the channel 3 in front of the dogs 4. The dogs having been just inserted, as seen in Fig. 2 the cock of pipe 55 would be opened to cause compressed air to enter the channel 3 in front of the dogs through the ports 46. To prevent undue leakage of air from the channel, suitable spring ring or other packings indicated by 38 may surround the channels 3.

To counteract any tendency of the dogs 4 to resist entry into the channels 3 owing to the action of centrifugal force upon them, I may neutralize such centrifugal effect by counterweights acting on the dog. The counterweights 56 carried by the bell cranks 20 have the desired neutralizing effect.

The modification Fig. 6 differs from the foregoing in that the male member M carrying the dogs 4 is here arranged as the drum or inner member, the dogs being projected outwardly into the channels 3 formed around the inner periphery of the cylindrical or outer member F, here the female member. In this figure, also, no means for introducing compressed air to the channels 3 is shown, and air at atmospheric pressure may be compressed in these channels.

The member M is slidable on and rotates with the shaft 2 on which is also slidable the collar 15 formed with a cam surface 15′. Levers 20 are pivoted to the dogs 4 and fulcrumed to links 20′ pivoted to the boss of the member M. The levers carry rollers at their free ends which are caused to bear on the cam surface 15′ by springs 57. On moving the collar 15 to the right the springs 57 draw the lever tails inwardly and project the dogs 4 into their channels 3. Insertion of the dogs is here assisted by centrifugal action.

In the modification Figs. 7 and 8, the male member M has only one radially movable dog 4 adapted to be inserted into and withdrawn from an angularly running or helical channel 3 of considerable length, here shown as making about two complete turns around the periphery of the female member F. The ends 3″ of the channel constitute stops for the dog. The dog is caused to enter the desired end of the channel 3, according to the direction in which the coupling rotates, by axial adjustment of the member F so as to bring the desired end of the channel in line with the dog, which latter, being caused to bear with pressure on the drum F, will jump into this end of the channel when it comes over it during relative rotation of the members M, and F.

Movement of the dog may be effected from the collar 15 rotatably and slidably mounted on the boss of the male member M. Fixed to the latter is a bracket 16 in which is mounted the rock shaft 17 at whose upper end is an arm 18 pivotally connected by the rod 19 with the bell crank 20, in turn pivotally connected with the dog 4. At the lower end of the shaft 17 is the arm 21 furnished with a stud carrying a block 22 which slidably engages with the annular slot 23 surrounding the collar 15. By sliding the latter axially by suitable means, the shaft 17 will be partially turned on its axis and thus project the dog 4 into the channel 3, or withdraw it therefrom.

As in the arrangement first described, the dog in traveling from its point of entry to the stop end of the channel, compresses the air in front of it so that the impact of the dog and stop is thus cushioned. There is relative axial movement of parts M and F as the dog travels along the channel. At each end of the channel 3 a relief valve 12 may be provided.

In Fig. 9 is shown a modification, in which a helical channel 3 extends around the drum or female member F and opens out from either end thereof. About midway this channel is blocked, providing the walls or stops 3″. Two fixed dogs 4 project from the interior of the male or cylindrical member M on opposite sides thereof, and are disposed at opposite ends of the drum F. By sliding the latter axially, one or the other dog will be caused to enter an open end of the channel 3, according to the direction of rotation, and to make air cushioned impact with one of the stops 3″ of said channel which stops are both located at a substantial distance from its open ends. In this modification it is necessary to relatively rotate the members F and M in reverse directions in order to disengage the clutch.

In all constructions, a clutch coupling according to my invention may comprise a single dog and a single channel or a plurality of dogs and a plurality of channels corresponding therewith. The channel may also be so shaped at its ends or points of entry, as to facilitate entry of the dog, and may further if deemed necessary be so shaped at other parts as to provide for the amount of air leakage desired.

In the modified form of female clutch member F shown in Fig. 10, a portion only of the channel 3 adjacent the part to be entered by the dog 4 runs angularly, the main portion of the channel being in a plane perpendicular to the axis of F. If the members M and F are relatively axially adjusted so that the part of the channel to be entered by the dog is in line with the latter, the dog will only be able to enter the channel at this part when it comes opposite thereto during relative rotation of the clutch members. As shown, nearly one half revolution in either direction of the shaft is made before the dog contacts with a stop or end 3″ of the channel. The point of entry need not be equidistant from the channel ends, as shown, but may be varied as desired, provided such point is substantially removed from the channel ends.

In the modified form of female clutch member F shown in Fig. 11, the channel 3, which is of considerable length, consists of portions 3 lying in parallel planes perpendicular to the axis of the member F and connected by portions 35 angular to said axis, so as to form a continuous channel.

If the members M and F are relatively axially adjusted to bring a point in an angular portion 35 of the channel in line with the dog 4, the latter can only enter the channel at this point, and if pressed against the periphery of F will jump into the channel when it comes opposite to this point during relative rotation of the clutch members.

It is obvious that the various constructions hereinbefore described may be considerably modified without in any way departing from my invention. It will also be understood that steam, or other elastic fluid, may be used instead of air, and the claims hereto appended are intended to cover the use of other elastic fluid than air for the purpose specified.

What I claim and desire to secure by Letters Patent of the United States is:—

1. A clutch coupling of the type referred to comprising a member having a channel, a member carrying a dog adapted to co-act with this channel to compress air therein during relative rotation of said members, and means for inserting the dog into and withdrawing it from the channel.

2. A clutch coupling of the type referred to comprising a member having a channel, a member carrying a radially movable dog adapted to co-act with said channel to compress air therein during relative rotation of the said members, and means for inserting the dog into and withdrawing it from the channel.

3. A clutch coupling of the type referred to comprising a member, having a channel, a member carrying a dog adapted to co-act with said channel to compress air therein during relative rotation of said members, means for introducing elastic fluid under pressure to the channel, and means for inserting the dog into and withdrawing it from the channel.

4. A clutch coupling of drum and cylinder type, comprising a member carrying a radially movable dog and a member provided with a channel with which said dog is adapted to co-act to compress air therein during relative rotation of said members, said channel running angularly to the plane or rotation adjacent the part to be entered by the dog, and means for inserting the dog into and withdrawing it from the channel.

5. A clutch coupling of the drum and cylinder type comprising a member provided with a helical channel, a member having a radially movable dog adapted to co-act with said channel to compress air therein during relative rotation of said members, and means for inserting the dog into and withdrawing it from the channel.

6. A clutch coupling comprising a member having a channel, a member having a radially movable dog adapted to co-act with said channel to compress air therein during relative rotation of said members, means for inserting the dog into and withdrawing it from the channel, and means for neutralizing the action of centrifugal force on the dog.

In testimony whereof I have hereunto set my hand in the presence of two witnesses.

FRANCIS HERBERT ALEXANDER.

Witnesses:
JOHN MORROW,
JAMES HALL.